(12) United States Patent
Lindstrom et al.

(10) Patent No.: US 12,525,141 B2
(45) Date of Patent: *Jan. 13, 2026

(54) TRAINING SYSTEM FOR HYGIENE EQUIPMENT

(71) Applicant: Essity Hygiene and Health Aktiebolag, Gothenburg (SE)

(72) Inventors: Hakan Lindstrom, Gothenburg (SE); Jenny Logenius, Gothenburg (SE); Gunilla Himmelmann, Gothenburg (SE); Maria Zevgren Sundberg, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,910

(22) Filed: Nov. 16, 2023

(65) Prior Publication Data
US 2024/0087472 A1 Mar. 14, 2024

Related U.S. Application Data

(63) Continuation of application No. 17/052,399, filed as application No. PCT/EP2019/052354 on Jan. 31, 2019, now Pat. No. 11,830,374.

(30) Foreign Application Priority Data
May 4, 2018 (WO) ................. PCT/EP2018/061522

(51) Int. Cl.
G09B 19/00 (2006.01)
G06T 19/00 (2011.01)
G09B 5/02 (2006.01)

(52) U.S. Cl.
CPC ........ *G09B 19/0076* (2013.01); *G06T 19/006* (2013.01); *G09B 5/02* (2013.01)

(58) Field of Classification Search
CPC .............. G09B 19/0076; G09B 19/003; G09B 19/006; G08B 21/245
See application file for complete search history.

(56) References Cited

U.S. PATENT DOCUMENTS

2009/0112541 A1* 4/2009 Anderson .......... G09B 19/0076
703/11
2011/0174348 A1 7/2011 Helenius
(Continued)

FOREIGN PATENT DOCUMENTS

CN 106448399 A 2/2017
CN 106991888 A 7/2017
(Continued)

OTHER PUBLICATIONS

Australian Government, IP Australia, Examination report No. 1 for standard patent application, Application No. 2019263901, mailed Sep. 3, 2021 (4 pages).
(Continued)

*Primary Examiner* — Robert J Utama
(74) *Attorney, Agent, or Firm* — CANTOR COLBURN LLP

(57) ABSTRACT

Providing to a human operator a view of displayed images and a view of a piece of hygiene equipment, the apparatus comprising an interface to a sensor which is configured to generate a motion sensor output indicating a movement of a human operator, an access to a data repository which stores base data for generating images representing views of an environment in which tasks by said human operator can be performed, an image generation section configured to generate the images to be displayed based on said base data and said motion sensor output, a sequencer section configured to determine a sequence of situations in relation to a view by said human operator, and an event section which is configured to determine an event in relation to said piece of
(Continued)

hygiene equipment and to allocate said determined event in relation to the sequence of situations.

18 Claims, 5 Drawing Sheets

(56) References Cited

U.S. PATENT DOCUMENTS

| | | | | |
|---|---|---|---|---|
| 2014/0282105 | A1* | 9/2014 | Nordstrom | G06F 3/016 |
| | | | | 715/753 |
| 2015/0127365 | A1* | 5/2015 | Rizvi | G06V 40/28 |
| | | | | 705/2 |
| 2015/0254965 | A1* | 9/2015 | Moore | G08B 21/245 |
| | | | | 340/539.12 |
| 2016/0307459 | A1* | 10/2016 | Chestnut | G06F 3/16 |
| 2017/0004699 | A1 | 1/2017 | Rizvi et al. | |
| 2017/0127143 | A1 | 5/2017 | Knudson et al. | |
| 2018/0293873 | A1* | 10/2018 | Liu | G16H 40/20 |

FOREIGN PATENT DOCUMENTS

| | | |
|---|---|---|
| CN | 107004044 A | 8/2017 |
| RU | 2510282 C2 | 3/2014 |
| WO | 2015192195 A1 | 12/2015 |
| WO | 2019237204 A1 | 12/2019 |

OTHER PUBLICATIONS

Canadian Intellctual Property Office, Office Action, Application No. 3,094,843, dated Oct. 21, 2021 (3 pages).
Edgar Dael, Audio Visual Methods in Teaching, 3rd edition, Holt, Rinehart, and Winston, 1969, 2 pages.
European Patent Office, International Search Report and Written Opinion of the International Searching Authority, International Application No. PCT/EP2019/052354, mailed Mar. 7, 2019 (14 pages).
Examination Report issued for Australian Patent Application No. 2019263901; Application Filing Date Jan. 31, 2019; Date of Mailing Apr. 4, 2022 (9 pages).
Examination Report issued in Application No. 768788; Application Filing Date Jan. 31, 2019; Date of Mailing Dec. 23, 2022 (6 pages).
Examination Report issued in Application No. 768788; Application Filing Date Jan. 31, 2019; Date of Mailing Sep. 13, 2022 (5 pages).
Examination Report issued in Australian Patent Application No. 2019263901; Application Filing Date Jan. 31, 2019; Date of Mailing Sep. 1, 2022 (6 pages).
Federal Service for Intellectual Property, Decision To Grant, Application No. 2020139628, mailed Nov. 15, 2021 (18 pages).
Federal Service for Intellectual Property, Official Notification of Examination Results, Application No. 2020139628, mailed May 25, 2021 (13 pages).
Intellectual Property India, Examination Report, Application No. 202017050472, dated Dec. 9, 2021 (6 pages).
National Intellectual Property Administration (CNIPA) of the People's Republic of China, Notification of the First Office Action (National Phase of PCT Application), Application No. 201980027792.2, dated Oct. 25, 2021 (30 pages).
New Zealand Intellectual Property Office, Patent examination report 1, Application No. 768788, dated Sep. 23, 2021 (4 pages).
Office Action Issued in Canadian Patent Application No. 3,094,843; Application Filing Date Jan. 31, 2019; Date of Mailing Jul. 27, 2022 (4 pages).
Search Report issued for Brazilian Patent Application No. BR20201120067; Application Filing Date Jan. 31, 2019; Date of Mailing Sep. 7, 2022 (4 pages).
Ukraine Intellectual Authority Preliminary Examination Report for Application No. 2020-07682; Date of Mailing Apr. 28, 2022 (7 pages).
World Health Organizaiton, Five moments for hand hygiene, https://www.who.int/gpsc/tools/Five_moments/en/, 2020 WHO, retrieved Sep. 3, 2020, 2 pages.
Examination Report issued for Australian Patent Application No. 2022228090; Application Filing Date Sep. 5, 2022; Date of Mailing Nov. 3, 2023 (3 pages).
Mexican Institute of Industrial Property, Office Action, Application No. MX/a/2020/011650, mailed Oct. 10, 2023 (4 pages).
Notification of Reexamination, CN Application No. 20190027792.2, mailed Nov. 6, 2025, with English Translation, 20 pages.

* cited by examiner

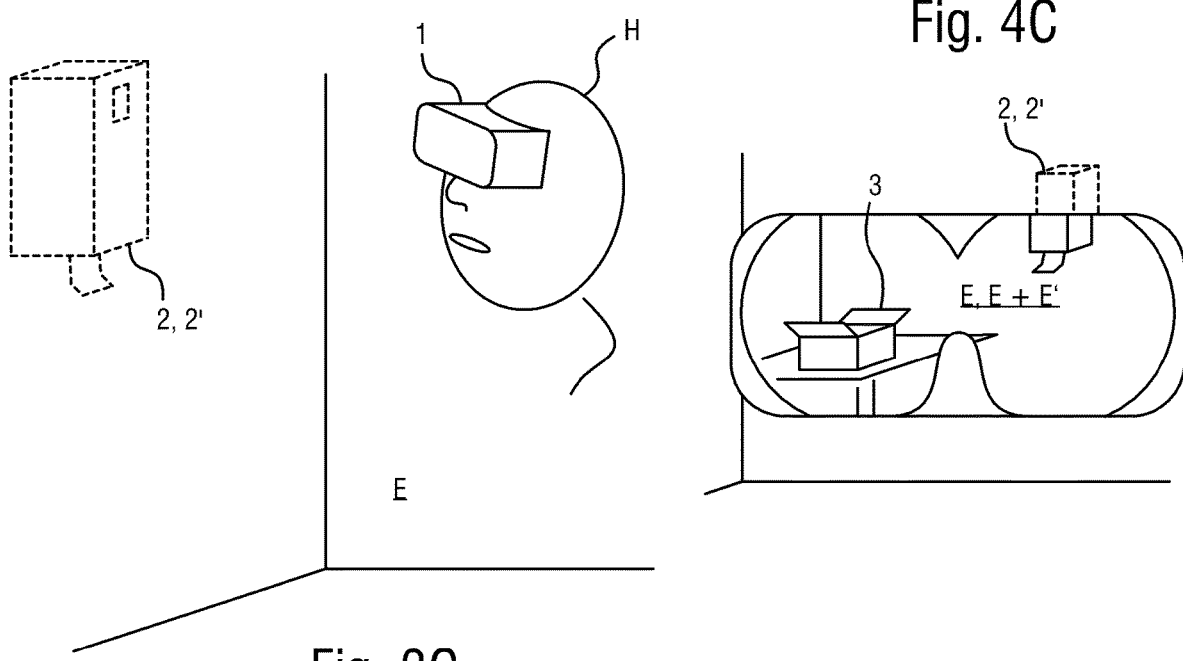
Fig. 4C
Fig. 3C
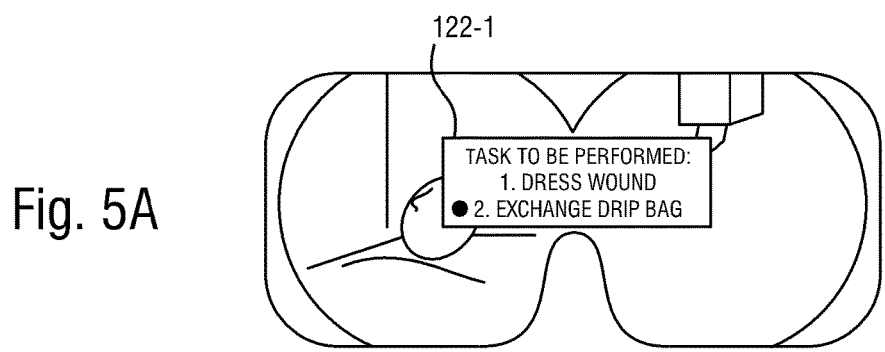
Fig. 5A
Fig. 5B

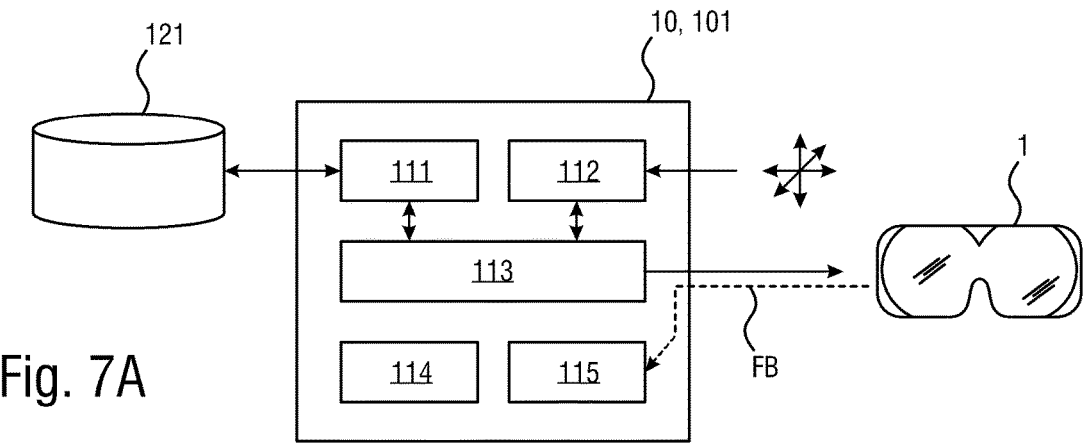
Fig. 7A
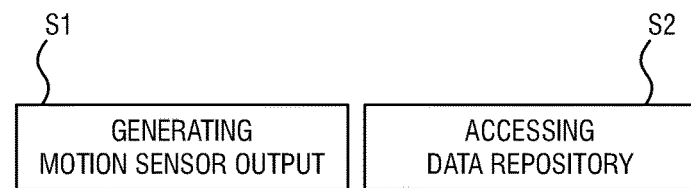
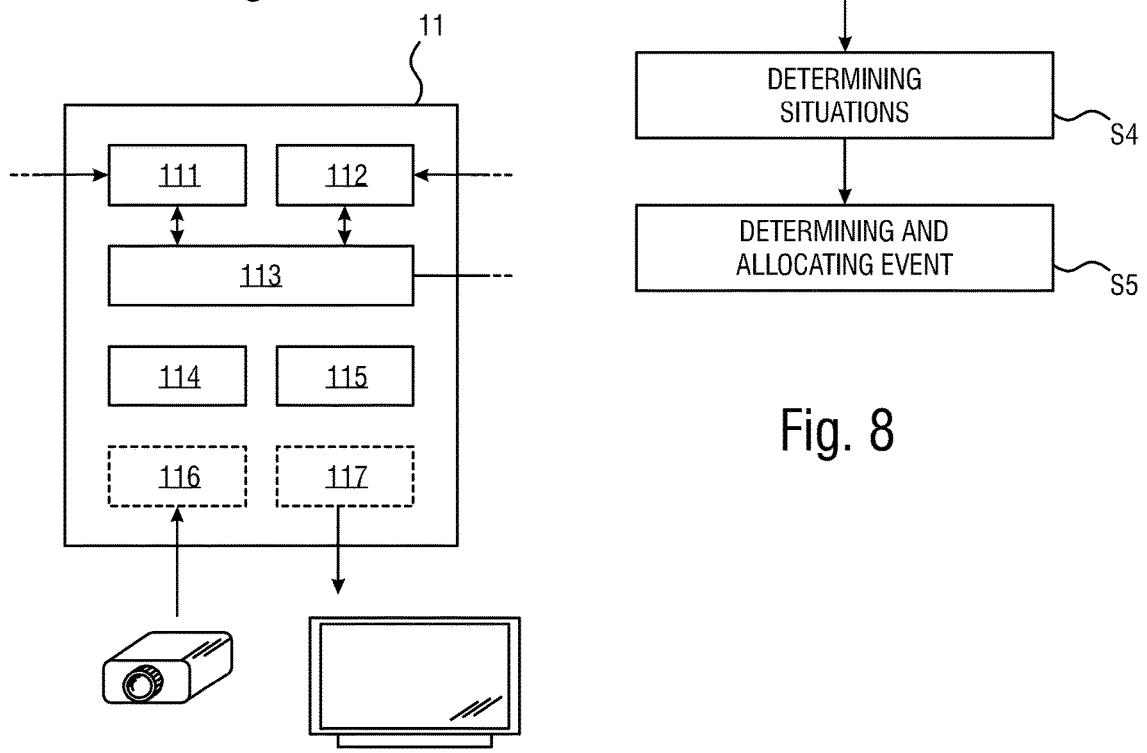
Fig. 7B
Fig. 8

TRAINING SYSTEM FOR HYGIENE EQUIPMENT

CROSS-REFERENCE TO RELATED APPLICATIONS

The present application is a continuation of U.S. patent application Ser. No. 17/052,399, which is a U.S. National Stage entry under 35 U.S.C. § 371 of, and claims priority to, International Application No. PCT/EP2019/052354, filed Jan. 31, 2019, which claims priority to International Application No. PCT/EP2018/061522, filed May 4, 2018, the disclosures of which are hereby incorporated herein by reference in their entireties.

FIELD OF THE INVENTION

The present invention relates to the field of equipment used for training. More particularly, the present invention relates to an apparatus to provide to a human operator a view of displayed images via a head-mounted display, HMD, taking into account the specific technical problems involved for improving the intake and perception of information. The present invention also relates to the field of hand hygiene, achieving hand hygiene compliance by training, and maintenance and/or installation of related hand hygiene equipment.

BACKGROUND OF THE INVENTION

Hygiene equipment is commonplace today in many facilities, such as hospitals, medical service centers, intensive care units, day clinics, private practices, lavatories, rest rooms, hotels, restaurants, cafes, food service places, schools, kindergartens, manufacturing sites, administration and office buildings, and, in general, places and facilities that are accessible to the public or to a considerable number of individuals. The described hygiene equipment thereby includes various types of individual devices and installations such as soap dispensers, dispensers for disinfectant solutions, gels or substances, towel dispensers, glove dispensers, tissue dispensers, hand dryers, sinks, radiation assisted disinfectant points, ultraviolet (UV) light, and the like.

Although such hygiene equipment is commonplace today in many places, the use thereof by the individuals visiting these places or working in these places is still oftentimes not satisfactory. For example, hospitals, and, in general, medical service centers often suffer from hygiene deficiencies, which, in turn, may lead to the spread of infections and related diseases. In particular, such insufficient hygiene amongst medical care personnel coming into close contact with patients and bodily fluids can lead to the spread of infectious diseases amongst the personnel and other patients. It is also known that infections by highly resistant bacteria pose a severe problem in such places, especially in hospitals. In general, so-called Healthcare Associated Infections (HAI) are a real and tangible global problem in today's healthcare. HAI can be found to be currently the primary cause of death for 140.000 patients/year, affecting millions more and costs society in the range of billions of EU R/year.

At the same time, however, it is known that hygiene, and, in particular, hand hygiene, is an important factor as far as the spread of infectious diseases are concerned. Specifically, medical care personnel should make proper use of hand hygiene at the right and appropriate opportunities, so that the spread of bacteria and other disease causing substances is minimized. The actual compliance to applicable hand hygiene regulations and the related usage of hygiene equipment, however, may depend on—amongst others—the management of the facility, accessibility and usability of the equipment, culture, the cooperation and will exercised by the individuals working in these places or visiting such places, training of individuals, time pressure and possibly also other factors. In other words, an important factor remains the fact that individuals may not make use of installed and provided hygiene equipment although they are supposed to. Also, individuals may make use of hygiene equipment, but not at appropriate times, situations, and moments. In any way, however, it is generally accepted that an increased use of hygiene equipment can substantially contribute in reducing the spread of bacteria and the like, which, in turn, can drastically reduce the appearance of related infections and diseases.

Against this background, the World Health Organization (WHO) has already defined the so-called "Five Moments Of Hand Hygiene" (cf. https://www.who.int/gpsc/tools/Five_moments/en/) including as explicit definitions for opportunities: 1. Before patient contact; 2. Before aseptic task; 3. After body fluid exposure risk; 4. After patient contact; and 5. After contact with patient surroundings. There are hence well defined and valid rules on how hand hygiene should be implemented and, moreover, assessment of corresponding hand hygiene compliance is becoming a regulatory requirement for the healthcare sector and may serve as an important quality improvement tool. Here, the compliance is to be understood as a figure indicating how good and effective hand hygiene is implemented and "lived" in a given facility and in relation to the applicable hand hygiene procedures such as, e.g., the above described suggested by the WHO.

As a consequence, one may have considerable interest in that a given or desired target compliance is achieved. In other words, there is considerable interest that the individuals (operators) that are involved with such facilities implement the hygiene scheme as good as possible so as to reduce the spread of any disease as effectively as possible. At the same time, however, the actual use of hygiene equipment may quite considerably depend on the behavior shown by the individuals. This leads, in turn, to the finding that actual compliance may be well dependent on the behavior of the individual(s) who are supposed to employ hand hygiene at given times.

Individuals, e.g., caring staff, nurses, doctors, cleaners, janitors and other people roaming the above-described hygiene critical facilities, may be for a considerable part employees of the facilities, implying that their main task will be fulfilment of the regular every-day work requirements. Usually, there is little time and few opportunities to educate individuals on hand hygiene in general, and, in particular, on how precisely hand hygiene is to be implemented in order to meet compliance and, eventually, to be most effective. At the same time, however, individuals may want to spend only little attention to aspects such as hand hygiene given usually a considerable load of ordinary main work. Further, personal, cultural, or other soft factors may render it difficult to educate individuals effectively, so as to attain satisfactory hand hygiene compliance. Conventionally, considerable resources are still spent on hand hygiene training, but still scientific studies show that the compliance rate is still disappointingly low. Such conventional trainings usually are based on concepts like theoretical group sessions, information leaflets, and the like.

Apart from the above described examples, there are however also other aspects in the context of hygiene equipment. Such aspects being then different from the actual or appropriate use of hygiene equipment and may include at least the installation, operation, maintenance, servicing, refilling, etc., of hygiene equipment. However, there are similar aims as regards the employment as a whole of hygiene equipment, and there is therefore a need for improving the actual use, operation and general handling of hygiene equipment, including not only the improvement of hand hygiene compliance, attained by individuals by more effectively train the individuals, on whose behavior the achievement of an appropriate employment and/or good compliance ultimately depends.

More specifically, there is a need for conveying related information to the individuals in an effective and reliable manner so that the actual perception of the information by the individuals is rendered more effective. With the necessary information appropriately perceived, the individuals may contribute in an improved employment of hygiene equipment and in particular embodiments attain a better hand hygiene compliance.

SUMMARY OF THE INVENTION

According to one aspect of the present invention there is provided an apparatus to provide to a human operator a view of displayed images and a view of a piece of hygiene equipment, the apparatus comprising an interface to a sensor which is configured to generate a motion sensor output indicating a movement of a human operator, an access to a data repository which stores base data for generating images representing views of an environment in which tasks by said human operator can be performed, an image generation section configured to generate the images to be displayed based on said base data and said motion sensor output, a sequencer section configured to determine a sequence of situations in relation to a view by said human operator, and an event section which is configured to determine an event in relation to said piece of hygiene equipment and to allocate said determined event in relation to the sequence of situations.

According to one aspect of the present invention there is provided a method to provide to a human operator a view of displayed images and a view of a piece of hygiene equipment, the method comprising the steps of generating a motion sensor output indicating a movement of a human operator, accessing a data repository which stores base data for generating images representing views of an environment in which tasks by said human operator can be performed, generating the images to be displayed based on said base data and said motion sensor output, determining a sequence of situations in relation to a view by said human operator, and determining an event in relation to said piece of hygiene equipment and allocating said determined event in relation to the sequence of situations.

BRIEF DESCRIPTION OF THE DRAWINGS

Embodiments of the present invention, which are presented for better understanding the inventive concepts but which are not to be seen as limiting the invention, will now be described with reference to the figures in which:

FIGS. 3A to 3C show schematic views of deployment environments and applications of some embodiments of the present invention;

FIGS. 4A to 4C show schematically views that are presented to an operator according to corresponding embodiments of the present invention;

FIGS. 5A to 5D show schematically views of a graphical user interface according to corresponding embodiments of the present invention;

FIGS. 7A and 7B show schematic respective views of general apparatus embodiments of the present invention; and FIG. 8 shows a schematic flow chart of a general method embodiment of the present invention.

DETAILED DESCRIPTION OF THE INVENTION

Figure 1:
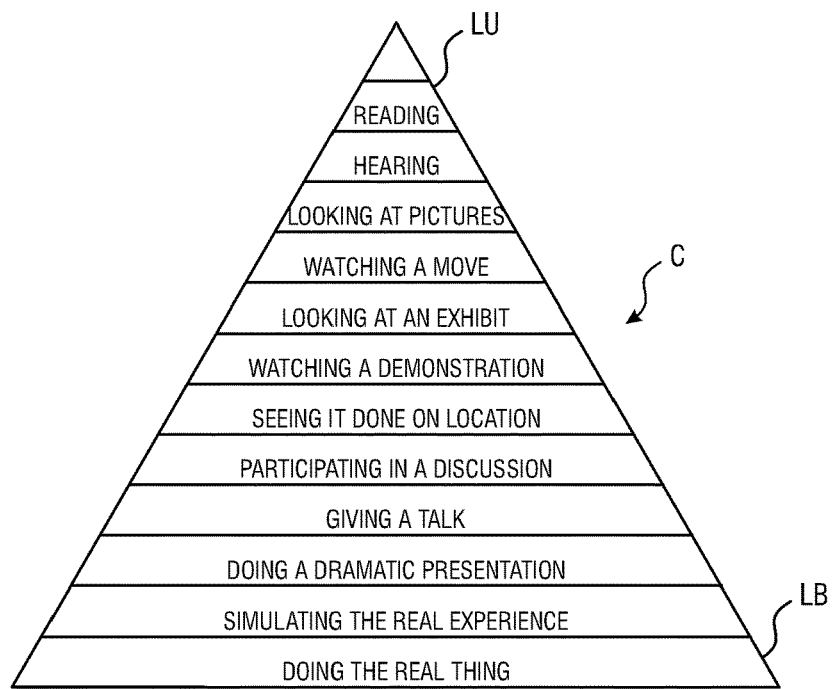
FIG. 1 shows a schematic pyramid view of possible human actions in relation to the level of actual physical perception for later remembering and application of the trained information.

FIG. 1 shows a schematic pyramid view of possible human activities for learning and training in relation to the level of perception. In particular, human perception, information intake, and—with this—the level of how much and how good perceived information is kept and can be remembered and applied later, strongly depends on the type of activity that is employed for learning and training. The pyramid C provides a hierarchical arrangement from a base level LB to an upper level LU, where activities mentioned in the pyramid C toward an upper level LU are perceived less for later remembering and applying, whereas activities located toward a base level LB are perceived better by the human physical circumstances and human perception.

The pyramid view of FIG. 1 represents the levels of perception of various actions as this order is established in the arts. In a way, the human physical circumstances and perception are such that the level of involvement in an action generally involves the degree of information being perceived for later remembering and application. In short, one learns more the deeper the involvement in an action is (cf. "cone of learning", developed and revised from base material by Edgar Dale, in: "Audio Visual Methods in Teaching" by Edgar Dale; $3^{rd}$ edition; Holt, Rinehart, and Winston; 1969).

One general aspect of how physical perception can be improved is that active actions lead to an improved perception as compared to passive action. The latter passive actions are thus located toward the upper "superficial" layer LU and include actions as for example—in an order of gradually improved perception—reading, hearing words, looking at pictures, watching a movie, looking at an exhibit, watching a demonstration, and seeing it done on location. The level of physical perception continues to improve with the aforementioned active actions including—again in the order of gradually improved perception—participating in a discussion, giving a talk, doing a dramatic presentation, simulating the real experience, and—finally—doing the real thing.

As a result, one of the best ways of learning is "doing the real thing" as located in FIG. 1 at the very base level LB. However, this actual execution of the real thing is not always possible in the context of learning or training. Specifically, many tasks may be sensitive to the level of correct and appropriate execution and wrong or inappropriate execution of a task may cause harm or unacceptable damage. For example, in the field of medical or caretaking treatment errors and mistakes may lead to physical unrepairable damages, injuries, infections, or other more or less substantial negative results. As, however, FIG. 1 shows, an optimum action with regard to the level of perception and intake of information, but at the same time avoiding any negative effects caused by mistakes and inappropriate execution of a task, is the simulating of a real experience as shown in level just atop the very base level LB.

Embodiments of the present invention specifically implement such a simulation of a real experience for improving the physical perception and intake of information, so that, in turn, the efficiency in training the correct behaviors and execution patterns in hand hygiene can be substantially improved. Therefore, embodiments of the present invention ultimately lead to an improved application of hand hygiene equipment and, with this, to a substantial contribution in reducing the risk of spreading infectious diseases.

Embodiments of the present invention in particular provide instructions that contribute to the solution of a technical problem with technical means in that said instructions relate to the visual transmission of information, where the main issue is not, however, the conveyance of certain content or the conveyance thereof using a certain get-up, but rather the presentation of image content in such a manner that takes the physical circumstances of human perception and in-take of information into account and where the presentation is directed at improving or expediently achieving this perception.

Figure 2A:
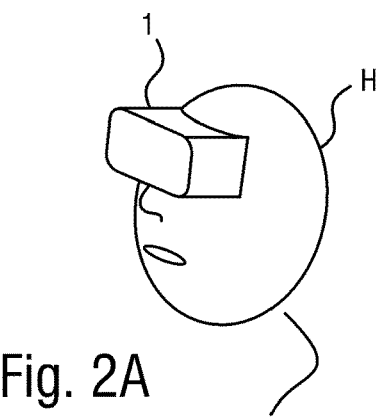
FIG. 2A shows a schematic view of a deployment and application of an embodiment of the present invention by a human operator.

FIG. 2A shows a schematic view of a deployment and application of an embodiment of the present invention by a human operator. Specifically, it is shown a human operator H wearing a so-called head-mounted display, HMD, 1 on her/his head and in front of her/his eyes. Such head-mounted displays appear in various forms and variants, wherein the usually common feature is to provide the human operator H at least a view of images generated by a display. This usually employs display units, including liquid crystal displays (LCD), light emitting diodes (LED), organic LED (OLED) displays, lasers, and the like for generating an image to be perceived by operator H. Generally, the images described in the context of the present disclosure may be any one of a sequence of images, a presentation, a video, a movie, a (video-)game, and the like.

Generally, the head-mounted display 1 may comprise also any one of a transparent portion, semitransparent portion, and one or more camera(s) so as to provide the operator H with a blended view which can be a combination of a real world view and the images generated. As such, one may refer to such displays also as virtual reality (VR) glasses, augmented reality (AR) glasses, and/or optical head-mounted displays (oHMD). Generally, the head-mounted display may provide a view to the operator H in two dimensions (2D) and/or in three dimensions (3D). The latter usually involves providing each eye of the operator H with different images that slightly differ so as to generate a virtual appearance of the displayed content in 3D. Related techniques are as such known in the prior arts.

Figure 2B:
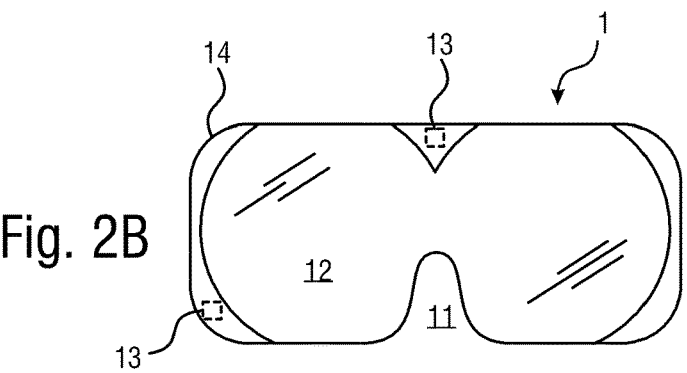
FIG. 2B shows a schematic view of a head-mounted display, HMD, as part of a deployment and application of an embodiment of the present invention.

FIG. 2B shows a schematic view of a head-mounted display, HMD, as part of a deployment and application of an embodiment of the present invention. Specifically, it is shown from an operator's (or user's) point of view. The inner side of the HMD 1 features an outer frame 14 which is more or less adapted to the human physiognomy by, for example, and amongst others, providing a nose section which accommodates an operator's nose. It is thus understood that the human operator carries and uses the HMD 1 especially when carried in front of the operator's eyes. Additional features may come into play with regard to the practical use of HMD's, such as strips, soft cushioned sections, shades, temples, etc., which are all, however, known in the arts as such.

The HMD 1 also provides an optical section 12 in the operator's field of view when carrying the HMD. The optical section 12 may comprise any one of a display, optics for allowing a view of a display that is arranged relatively close to the operator's eyes (e.g., 5 to 100 mm), transparent sections, shades, shutters, filters, polarizers, projectors, illumination, cameras, mirrors, semi-transparent mirrors, screens, opaque sections, etc. Each one of these optical components may be provided individually for each eye of the human operator or may be provided as one part. For example, there already exist HMD that employ a smartphone as display means: In this way, such an HMD comprises a frame for holding the smartphone and optics that allow an operator to view the display even if arranged at small distances (see above). The display may generate views for each eye at the same time in which the optics then guide each image to the corresponding eye, or the display may display images alternately, where then shutters guide an image to only one eye at a time. By means of providing individual images for each eye, a three-dimensional view of the environment can be obtained for the operator.

The purpose of the optical section 12 is to provide the operator with a view that at least in part comprises generated images. In this way, the operator can view an environment that at least in part comprises views of an artificially generated environment. For example, the display receives from an image generation processor image data that is displayed. In turn, the image generation processor receives or has access to data that defines the virtual environment, for example, using definitions of vectors. These vectors can be used to calculate and generate a momentary view of the environment given a specific orientation. Further, the vectors may define surfaces with optionally textures that in all will be referred to by the image generation processor when generating the image data to be displayed on a display. Additional mechanisms may apply for rendering the view more or less realistic (e.g., raytracing and the like).

As already described, the view for the operator may also consider an orientation. If, for example, the operator carries a HMD, she or he is in principle free to move about, turn into different directions, move his/her arms, hands, and other body parts. Preferably, these various movements are accounted for so that the view that is presented to the operators is as realistic as possible. For this purpose, the orientation and/or the movement by the operator is detected and the resulting signals are fed into the image generation processor, which, having at hand vector base data, can recalculate the view of an environment from a different orientation. The HMD 1 may in this case also comprise one or more sensors 13 that can detect in the form of, e.g., accelerometers, gyroscopes, magnetometers and the like, the movement of the operator's head or the operator as a whole.

Further, there exist camera assisted systems that observe the operator, e.g., while using an HMD. Images received from such a camera can be processed to obtain information on the movement of the user or his/her body parts. Such information can be again fed into the image generation processor that can employ this data in a similar manner to employing output data from movement sensors affixed to the operator and/or the HMD 1 that the operator is carrying and using. Such image processing is usually referred to as gesture recognition and in principle associates some specific action (situation, command, etc.) to a gesture or a group of gestures, wherein a gesture can be defined as a sequence or group of movements.

The optical section 12 of the HMD 1 may also comprise one or more transparent section(s) that allow the operator to view the actual environment. By means of a projector, a display, a mirror, and/or a semitransparent mirror a generated view may be therefore blended with the actual view of the actual environment. Whereas the view of only generated images in the context of an HMD is usually referred to as a virtual reality (VR) view, the blending of the real world with generated images is usually referred to as augmented reality (AR). The common concept is that an operator may at least in part perceive an artificially generated environment.

Figure 2C:
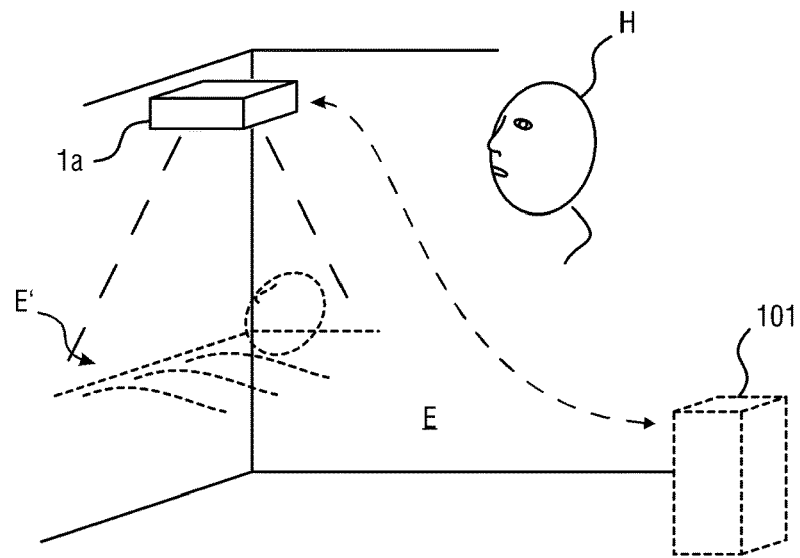
FIG. 2C shows a schematic view of a deployment and application of an embodiment of the present invention by a human operator.

FIG. 2C shows a schematic view of a deployment and application of an embodiment of the present invention by a human operator. Here, an apparatus 1a, 101 is shown that provides to a human operator H a view of displayed images E' and a view of a piece of hygiene equipment. The latter piece of hygiene equipment can also be shown as part of respective images (see below in the context of FIGS. 3A & 4A) or may be well of the real world, i.e., in the form of a real dispenser mounted to a wall (see below in the context of FIGS. 3B & 4B). Specifically, this configuration and embodiment considers at least one projector device 1a that is arranged to project images onto walls and surfaces of a real environment E. In this way, a virtual environment E' is generated that can be viewed by the operator H. This environment may include a patient station (as shown) as an environment in which the operator H is supposed to perform a task.

The projector device 1a may implement all features necessary for an embodiment of the present invention or may have one or more functionalities in a further device 101 (e.g., server or computer device, network, cloud resource, etc.). Further, the display of images may be such that a two-dimensional or three-dimensional impression of the virtual environment E' is generated. In the latter three-dimensional case the operator H may be provided with additional devices (e.g., shutter or polarizing glasses) so that the virtual environment appears for the operator in three dimensions. Other projection techniques such as direct eye (retina) projection may also apply.

There is therefore provided an access to a data repository which stores base data for generating images representing views of an environment in which tasks by said human operator can be performed. As shown in the example of FIG. 2C, that task can be performed by the human operator H in an environment E/E' that includes a virtual representation of a patient and the task(s) can include one or more actions in relation with that virtual patient and the use of hygiene equipment. Likewise, however, other embodiments envisage environments that do not consider a patient as such and may focus on actions that relate to the hygiene equipment, for example the installation and/or maintenance of one or more pieces of hygiene equipment.

Figure 3A:
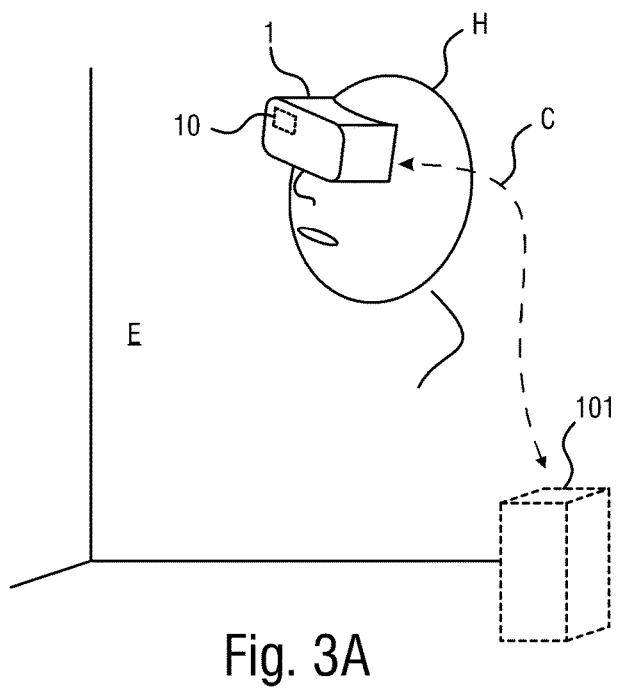
Figure 4A:
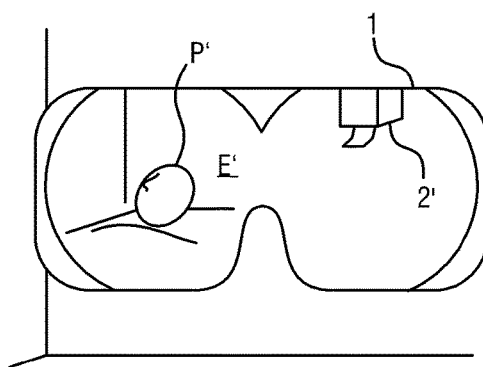

FIG. 3A shows a schematic view of a deployment environment and application of an embodiment of the present invention. Specifically, it is shown the operator H wearing and using a head mounted display 1 in a real environment E. According to this embodiment an apparatus provides to the human operator H a view of displayed images via a head-mounted display (HMD) 1. The apparatus can be any one of a device or processing unit 10 integrated in the HMD 1, or an external apparatus 101 in the form of, for example, a computer or some cloud (remote) computing resources. A communication C may be established between the HMD 1 toward the apparatus 10' so as to convey data toward the HMD 1 for it being able to display the corresponding views to operator H. The communication C may be implemented by any suitable means, such as a wireless local area network (WLAN, WiFi, and the like), a Bluetooth™ connection, or any other suitable wireless or wire-bound connection.

The HMD 1 is configured to provide a view of a piece of hygiene equipment. In the present embodiment, HMD 1 comprises a display that provides a view to the operator H as shown schematically in FIG. 4A. As shown, the operator is presented a virtual, generated view of an artificial environment E', comprising, for example, a patient P' in a bed on the left-hand side. It is to be understood that this E' is fully artificial and is generated by processing base data in an apparatus 10 for displaying the generated images on a display as part of the head mounted display 1. The piece of hygiene equipment 2' is shown at least in part, indicating that in the present embodiment, the dispenser 2' (as one exemplary piece of hygiene equipment) belongs to the virtual world, i.e., the dispenser 2' shown in head mounted display 1 is a view appearing on the display.

The apparatus 10, 101, or both 10 & 101 comprise an interface to a sensor which is configured to generate a motion sensor output indicating a movement of the human operator H while using the HMD 1. For example, the sensors 13 as described in conjunction with FIG. 2B that may be integrated in HMD 1 may generate said motion sensor output that then can be taken into account when operator H turns/tilts his/her head and/or moves about. The result is that a similarly corresponding motion is perceived—albeit from the point of view of operator H—in the virtual environment E'. In the present embodiment, the operator H is presented with a virtual environment E' in which (s)he can view one or more virtual patient(s) P', one or more virtual piece(s) 2' of hygiene equipment, and other related objects and appearances. For this purpose, the apparatus comprises an access to a data repository which stores base data for generating images representing views of the environment E' in which tasks by the human operator H can be performed. The described tasks are any one of real tasks (the operator still lives in and is still part of the real world environment E), tasks performed in the virtual environment E', and/or tasks that are fulfilled by choosing, selecting or activating actions in a user interface as part of the virtual environment E' (more details on this will be given in the description relating to FIG. 5A).

The apparatus further comprises an image generation section that is configured to generate the images to be displayed based on said base data and said motion sensor output. As already described, the images can be, for example, generated (calculated) from base data such as a collection of vectors, which all define an edge and/or boundary of a virtual object including patient P', the piece of hygiene equipment 2', and/or any other object or other entity that should render appearance in the virtual environment E'. The techniques of generating a VR or AR to an operator by means of a head mounted display are as such known in the arts.

The apparatus further comprises a sequencer section configured to determine a sequence of situations in relation to the view of the operator and/or the displayed images. A situation in this context can be identified as some given point in the process of a task. For example, the task can be defined as a sequence or group of situations to which the operator needs to navigate to. The navigation within the overall environment including the actual and the virtual environment may be achieved by the operator by any one of giving commands (e.g., in the context of a user interface described below), a gesture, movements, turning, changing orientation, looking into a specific direction, walking or moving to specific locations, and the like. Generally, such a situation can be associated to a displayed image, so that the apparatus may determine occurrence of the situation by analyzing the view (e.g., by a camera) and/or the displayed images. For example, a task of changing a drip bag may be presented to the operator by a sequence of images of which one or more images indicate that a certain situation has been reached, which, in turn, may also indicate fulfillment of a task at the same time.

The apparatus further comprises an event section which is configured to determine an event in relation to said piece of hygiene equipment and to allocate said determined event in relation to the sequence of situations. In the present embodiment, the event section is configured to determine as an event a use situation of said piece of hygiene equipment. If the piece of hygiene equipment is virtual and therefore exclusively part of the displayed images, a mechanism similar to the above described sequencer section may apply. For example, a gesture by the operator H may be detected which results in providing the operator a view of using the piece of hygiene equipment. One or more of such images may indicate that a use situation has occurred. Likewise, the event section may also be configured to determine a use situation from a real world piece of hygiene equipment which is described further below.

Figure 3B:
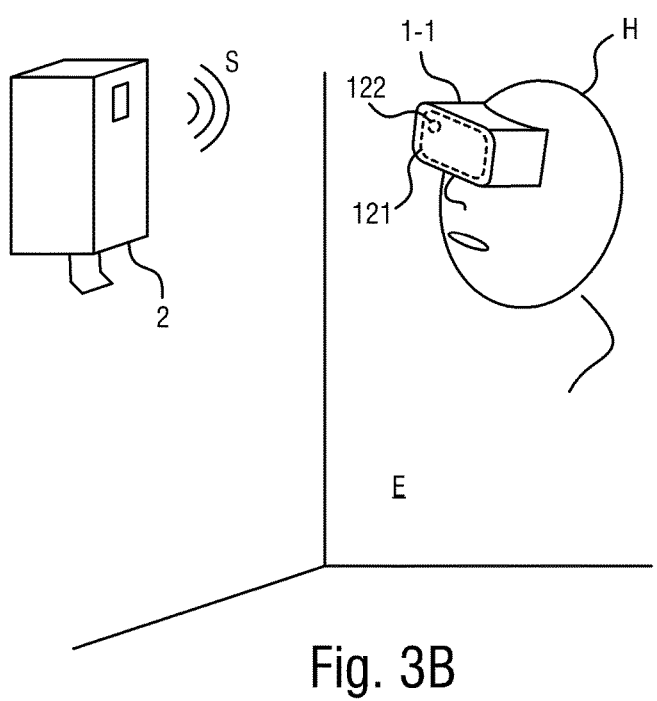
Figure 4B:
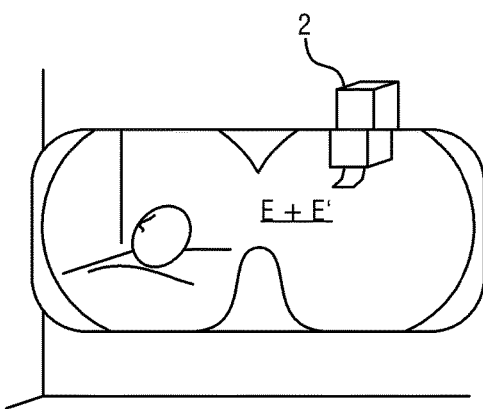

FIG. 3B shows a schematic view of a deployment environment and application of a further embodiment of the present invention, and FIG. 4B shows schematically a view that is presented to an operator according to the present embodiment. In principle the present embodiment is similar to the embodiment as described above in conjunction with FIGS. 3A and 4A. Therefore, like elements are denoted with identical reference signs. However, the present embodiment envisages that the head mounted display 1-1 has a transparent section 121 which allows the operator H also to observe and view the real environment E. With additional images being generated and superimposed, the operator will experience an augmented reality (AR) as a blended view of the real environment E and the virtual environment E'. This can be implemented by means of a semitransparent mirror as part of the transparent section 121, which allows viewing of the real environment E and viewing of generated images being displayed by a display/projector and reflected from the mirror.

Alternatively to the transparent section or in addition thereto the HMD 1-1 may also be provided with a camera 122 for capturing the real environment E, which then can be blended with further images to be displayed so as to provide the operator with a view of generated images (or generated image content) and real world images (image content taken from the recorded real environment). The camera 122 can be further employed to detect an optical signal S that a piece of hygiene equipment emits when used. Advantageously, most or all functionalities can be implemented in a mobile phone (smartphone) or tablet computer that can be affixed in front of the operator's eyes for employing its display to display any images to be viewed by the operator. At the same time, the camera on the other side of the device will face the environment and may thus be employed to capture the real environment and/or detect signals from pieces of hygiene equipment, remote controls, and the like.

In this embodiment, the head-mounted display 1-1 is therefore configured to provide a view of a real-world piece of hygiene equipment in the form of the real-world dispenser 2 shown in FIG. 3B. The corresponding view to the operator H is schematically depicted in accompanying FIG. 4B, in which again both a patient and a dispenser is shown, but the dispenser 2 belonging to the real world. It is clear that especially in this embodiment the operator H will see also his/her hands when, for example, using the piece of hygiene equipment. This has the additional benefit that the operator may actually use a real dispenser and thus will also be able to experience the sensation of using such a dispenser (e.g., experiencing the sensation and feeling involved when cleaning liquids and the like are ejected onto an operator's hand).

In this embodiment, the apparatus comprises an event section which is configured to determine as an event again a use event of the dispenser 2 as one exemplary form of a piece of hygiene equipment. Specifically, the apparatus may receive a signal S from the dispenser 2 whenever used. Likewise, the apparatus and/or the head-mounted display may be configured to determine such a use event by corresponding sensors or a camera recording a part of the environment. In the latter case image processing can be performed in order to determine such a use event.

As shown in FIG. 3B, the piece of hygiene equipment (dispenser 2) is arranged to dispense an amount of a consumable (e.g., soap, disinfectant, etc.) to an operator. The dispenser 2 comprises an ejection mechanism with a lever that can be actuated by the user so as to expel the soap, disinfectant or the like. Likewise, other mechanical and/or electric ejection mechanism may apply, that include any one of a switch, proximity sensor, pump, motor, actuator, battery, solar cell, etc. Generally, however, the ejection mechanism is arranged to dispense an amount of the consumable when an operator actuates the lever or activates the mechanism and hence provides mechanical force of a pump or dosing mechanism. In the present embodiment, the operator's action of actuating the lever is one form of a user operation or use situation that triggers the emission of a signal S. Specifically, the dispenser 2 according to this embodiment comprises a signal unit that is arranged to emit signal (e.g., flash of light) in response to the corresponding operator action, i.e., the actuation of lever. In any way, however, the signal unit emits the signal S so that it can be detected by an apparatus (e.g., HMD 1-1) in the vicinity of the dispenser.

Specifically, the detecting device can be provided with a light detector that can "receive" the signal S in the form of a flash emitted by the dispenser 2. Suitable components include a camera section, a photodiode, an infrared (IR) sensor, a luminosity sensor, and the like. The detecting device further should be provided with processing resources that are at least suitable for detecting and identifying the signal via the detector and to store and/or forward data relating to this detection. As far as the detecting device as such is concerned, any suitable implementation may be chosen, including mobile devices such as mobile phones, smartphones, personal digital assistants (PDAs), tablet computers, portable computers, notebooks, etc. Advantageously, in such devices the functionalities of the apparatus according to the embodiments of the present invention (interface, sensor, access to a data repository and/or data repository, image generation section, display, sequencer and event section) can be implemented in combination with the detector (e.g., the smart phone's camera) for detecting a signal S from a real world piece of hygiene equipment.

FIG. 3C shows a schematic view of a deployment environment and application of another embodiment of the present invention. Specifically, it is shown the operator H wearing and using a head mounted display 1 in a real environment E. According to this embodiment again an apparatus provides to the human operator H a view of displayed images via a head-mounted display (HMD) 1. The apparatus can be any one as already described in conjunction with the preceding embodiments. Specifically, the HMD 1 is configured to provide a view of a piece of hygiene equipment, which may be a virtual piece of hygiene equipment 2' or a real piece of hygiene equipment 2. The view to the operator H is shown schematically in FIG. 4C, in which the operator is presented with a virtual, generated or blended view of an environment E, E', comprising the piece of hygiene equipment 2, 2' and, optionally, one or more other elements 3.

In the present embodiment, the operator H is presented with environment E, E' in which (s)he can perform one or more tasks and can view one or more virtual or real piece(s) 2, 2' of hygiene equipment, and other related objects 3 and appearances. For this purpose, the apparatus again comprises an access to a data repository which stores base data for generating images representing views of the environment in which tasks by the human operator H can be performed. The described tasks are any one of real tasks (the operator still lives in and is still part of the real world environment E), tasks performed in the virtual environment E', and/or tasks that are fulfilled by choosing, selecting or activating actions in a user interface as part of the virtual environment E' (more details on this will be given in the description relating to FIG. 6A).

The apparatus further comprises an image generation section that is configured to generate the images to be displayed based on said base data and said motion sensor output. As already described, the images can be, for example, generated (calculated) from base data such as a collection of vectors, which all define an edge and/or boundary of a virtual object including the piece of hygiene equipment 2', and/or any other object, such as element 3, or other entity that should render appearance in the virtual environment E' or blended environment E+E'.

The apparatus further comprises a sequencer section configured to determine a sequence of situations in relation to the view of the operator and/or the displayed images. A situation in this context can be identified as some given point in the process of a task. For example, the task can be defined as a sequence or group of situations to which the operator needs to navigate to. The navigation within the overall environment incl. the actual and the virtual environment may be achieved by the operator by any one of giving commands (e.g., in the context of a user interface described below), a gesture, movements, turning, changing orientation, looking into a specific direction, walking or moving to specific locations, and the like. Generally, such a situation can be associated to a displayed image, so that the apparatus may determine occurrence of the situation by analyzing the view (e.g., by a camera) and/or the displayed images. For example, a task of effecting a refill to a piece of hygiene equipment may be presented to the operator by a sequence of images of which one or more images indicate that a certain situation has been reached, which, in turn, may also indicate fulfillment of a task at the same time.

The apparatus further comprises an event section which is configured to determine an event in relation to said piece of hygiene equipment and to allocate said determined event in relation to the sequence of situations. In the present embodiment, the event section is configured to determine as an event a completed task in relation to said piece of hygiene equipment. For example, a gesture by the operator H may be detected which results in providing the operator a view of effecting an action in relation to the piece of hygiene equipment. One or more of such images may indicate that a corresponding action was effected.

Likewise, the event section may also be configured to determine such an action from a real world piece of hygiene equipment. In such an embodiment, the event section may comprise a sensor that is configured to detect a signal from a piece of hygiene equipment and the event section is configured to determine the event in response to detecting such a signal from the piece of hygiene equipment. For example, a task may be to unpack a piece of hygiene equipment from a box 3 and to mount it accordingly to a wall. Related disclosure for fulfilling tasks, corresponding action in relation to a piece of hygiene equipment, and determining a corresponding event in relation to the piece of hygiene equipment for allocating such an event in relation to a sequence of situations is provided elsewhere in the present disclosure in conjunction with FIGS. 6A through 6D.

Figure 5C:
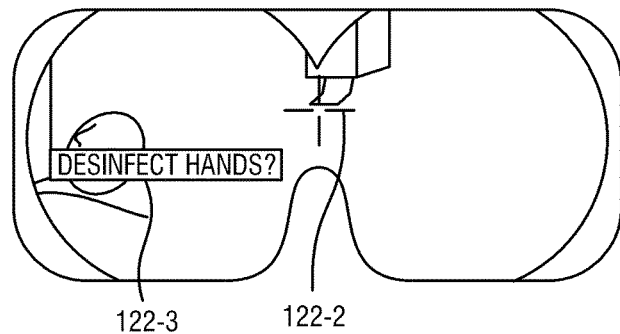

FIGS. 5A to 5D show schematically views of a graphical user interface according to corresponding embodiments of the present invention. Specifically, these Figures also depict the appearance of a user interface before, during, and/or after performing a task, wherein the user interface allows the display of operation elements, such as dialogs, notices, instructions, warnings, boxes, windows, menus, a focus, a hot spot, and the like. Generally, a task can be characterized by one or more situations that the operator needs to perform or to enter. For example, a task may be conveyed to an operator by means of a user interface as part of the virtual environment E'. FIG. 5A shows a schematic view of a user interface comprising a dialog 122-1 which conveys the nature of a task in a perceivable manner. In addition, the dialog 122-1 may comprise a menu that allows a user selection of one out of several options, wherein the operator can move a selection mark (●) by gesture and/or user input. In addition thereto an audio section may be provided which is configured to mimic sound from environment and/or instructions, alerts to change the target sequence of situations and observe operator's behavior in stress and/or unforeseen scenarios and alert situations.

In general, the operator may be provided with additional devices, e.g., a handheld remote control or any other suitable input device, so as to respond to any situations appearing in the view or as part of one or more dialogs of the user interface. In such embodiments, the apparatus further comprises an input section that is configured to receive such user inputs. In an embodiment, the apparatus comprises a sensor configured to receive a signal in relation to a user input via a wireless path (e.g., Bluetooth™, infrared, and the like). In the shown situation, the operator can send a user input signaling a response to a dialog, and the dialog 122-1 may accordingly disappear. The operator is then left to freely operate the system in a way that is in line with the respective task. The task can be defined as a sequence of situations in relation to the displayed images in the sense that an operator needs to steer his/her own virtual or augmented real view to specific situations, positions, and/or orientations. For example, it can be defined that a task like "1. DRESS WOUND" would first require at least the actual approaching of the virtual patient P' by the operator by means of any one of movement, orientation, look, user input, and the like.

FIG. 5B shows schematically a view of the graphical user interface with a focus 122-2, arranged preferably in the center of the field of view.

As shown in FIG. 5C, this may allow to determine a situation in relation to the viewed image. Specifically, a position of the focus 122-2 in relation to a real-world or virtual element may be evaluated for determining whether the operator has steered himself/herself to a specific situation (here: a situation of possibly now using a piece of hygiene equipment). Regardless of whether the shown dispenser is of the real or virtual world, a use can be effected by the operator by simply behaving as using it. The actual use of a real-world dispenser can be detected as already explained, or the respective gesture by the operator can be detected and assumed as a use event. In the latter case, camera assisted image processing and/or sensors affixed to the operator may be employed for gesture determination. Further, a dialog 122-3 may appear in response to a specific situation (e.g., focusing onto a piece of hygiene equipment) which may prompt a user input, for example, by means of a gesture, command, spoken command, input on a remote control and the like.

Figure 5D:
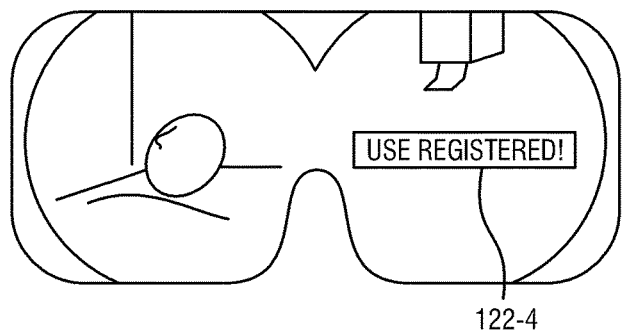

FIG. 5D shows schematically a view of the graphical user interface with a further notification 122-4. For example, a notification may appear in response to detecting a use of the piece of hygiene equipment, let the use as such be virtual, real, or by means of a user input/selection. This may also be seen again as a specific situation, in this case the successful use of a piece of hygiene equipment.

In general, the task can be thus performed by steering into one or more situations. More specifically, a task may be defined as a sequence of situations in relation to the displayed images. In this way, the sequencer section can observe operation, process periodically the viewed images, reading out a sensor, detecting any events of a user interface, and/or receiving user inputs, so as determine both the occurrence of a situation and placing this situation in a sequence. Said sequence may not only consider an order of subsequent situations but also a time between two adjacent situations. In this way, there can be implemented a rule, or more generally, a target way of how the task is properly performed. In the exemplary context of hand hygiene training, a specific rule may be defined in relation to situations the operator needs to enter and times there in between.

For example, a task "1. DRESS WOUND" may require the operator to use hygiene equipment (situation 1) before he steers to the patient for engaging with the patient (situation 2), which already defines a target sequence. This sequence may be evaluated for compliance to a rule, which, in turn, can also be defined by means of a sequence of situations. Additionally, time spans may be considered by timestamping the situations and measuring the time between two or more situations (for example, if too much time has elapsed after situation 1 and situation 2 or another situation is detected, then a violation of the corresponding rule may be determined).

In general, the sequencer section observes the course of situations in which the operator finds herself/himself during performing a task. This sequence of situations and/or a selection of situations may be associated with one or more opportunities to use a piece of hygiene equipment. Such an opportunity defines a target use of a piece of hygiene equipment by the operator in the sense that the operator shall now (or within a given time period) or should have before (or within a given time period) used the piece of hygiene equipment in order to be compliant to a rule. This may be evaluated together with the use events received or determined by the event section in order to assess whether or not a use situation can be associated to an opportunity. This may be employed for calculating an overall compliance metric during a task which can then be presented to the operator during and/or after a task so as to convey information to an operator on how good she or he is performing the task in relation to hand hygiene compliance.

In a further embodiment, individual hand hygiene compliance data obtained, e.g., from hand hygiene surveillance and/or monitoring systems may be used to weigh the occurrence of specific training scenarios and tasks so that specific tasks (or moments as described elsewhere in the present disclosure) where an operator (individual) has a low compliance occurs more often in the virtual training. Further, said occurrence may alternatively or additionally depend on a performance of an operator with regard to a compliant behavior during a present or past operation of the apparatus and training therewith.

Figure 6A:
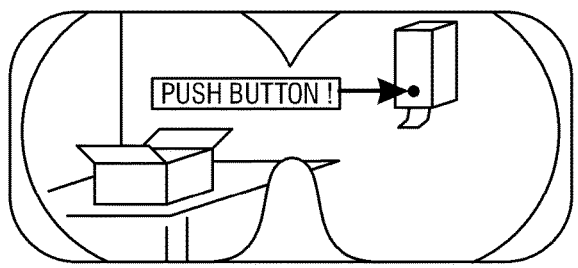
FIGS. 6A to 6D show schematically views of a graphical user interface according to corresponding embodiments of the present invention.
Figure 6B:
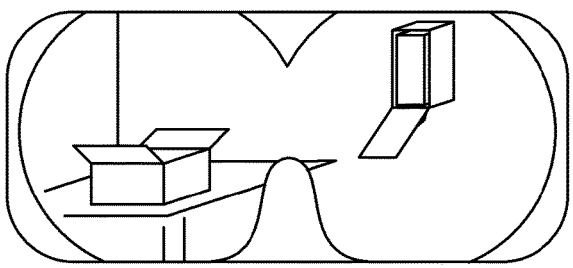
Figure 6C:
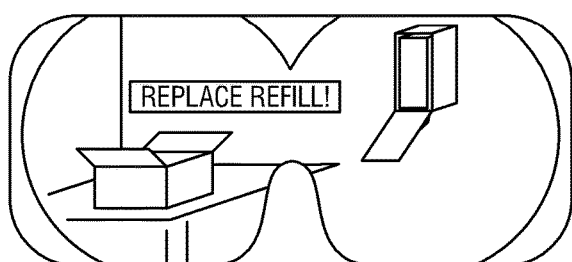
Figure 6D:
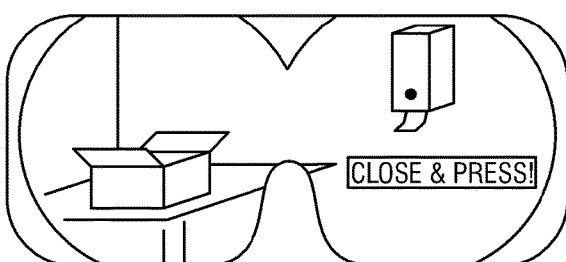

FIGS. 6A through 6D show schematically views of a graphical user interface according to corresponding embodiments of the present invention. In this embodiment, the task to be performed by the operator H is, for example, the correct replacing of a refill cartridge to a piece of hygiene equipment. In this course, there may be given instructions to the operator as shown in FIG. 6A, 6C or 6D. These instructions may be provided visually (as shown) or also by means of audible (voice) instructions by any sound generating and output unit. The operator carries out an action by gestures which are virtually reproduced in the view or are blended by means of superimposing generated image content and a real world scene recorded by a camera as described already elsewhere in the present disclosure.

The apparatus comprises an event section which is configured to determine an event in relation to said piece of hygiene equipment and to allocate said determined event in relation to the sequence of situations. The event can be any action in relation to the piece of hygiene equipment as effected by the operator and sensed by determining associated pictures or receiving any corresponding sensor signals and output. For example, in response to the instruction given to the operator as shown in FIG. 6A, the operator effect a gesture (action) to operate the virtual or real world piece of hygiene equipment accordingly. If the event of pushing the button has been detected, this can be allocated into a sequence and it can be determined whether or not the appropriate action was effected at the appropriate time. Accordingly, an environment can be presented to the operator that reflects the correct result of his/her action (as shown in the example of a correctly opened piece of hygiene equipment in FIG. 6B).

Further, a real world piece of hygiene equipment may be configured to emit a signal whenever a specific action is effected. For example, a piece of hygiene equipment may emit a signal whenever it is correctly closed after a refill and/or opening procedure. In such an embodiment, the event section can comprise a sensor that is configured to detect such a signal from the piece of hygiene equipment. Further, the event section can be configured to determine a corresponding event of closing the piece of hygiene equipment in response to detecting this signal. The event section can thus determine such an event in relation to the piece of hygiene equipment and allocate the event in relation to an applicable sequence of situations.

For example, the sequence of situations may specifically consider whether or not and when the closing of a piece of hygiene equipment is determined: if such an event is determined after a refill was correctly placed, then it may be determined that the operator has fulfilled the task properly in line with the applicable sequence. In this way, a task in relation to the piece of hygiene equipment can be trained or the training success can be improved and confirmed by means of letting the operator simulating a given task. Related embodiments not only consider the task of replacing a refill but likewise consider the correct mounting, installation or setup of a piece of hygiene equipment, the general maintenance of a piece of hygiene equipment, and the proper use and operation of a piece of hygiene equipment. Therefore, the following tasks can be implemented by respectively providing appropriate base data and defining appropriate sequences: Guiding operators through installation, maintenance or operation of dispensers/equipment, incl. refilling; a virtual manual; guided cleaning; operation of trolley with a dispenser on the trolley or trolley as such in the sense of a piece of hygiene equipment; installation and setup/configuration of accessories and upgrades to pieces of hygiene equipment, such as detectors, sensors, batteries; and gateway, repeaters, or related data acquisition and communication equipment that interacts with hygiene equipment for usage and/or state reporting.

Generally, there may be further provided embodiments in which an apparatus comprises a sound output section that is configured to output a sound to said human operator in relation to allocating a determined event. The sound can be an audible signal, a voice instruction or any other suitable audible feedback or instruction to the operator while (s)he is operating and performing a task. The contents may be provided from corresponding base data and may be used for instructing the operator, guiding the operator through a task, and/or giving positive or negative feedback upon successful operation or, respectively, unsatisfactory operation. For example, specific noise patterns can be provided that mimic a successful completion of an action (e.g., a "click" noise for notifying the operator that a refill was properly installed, a piece of hygiene equipment was correctly installed, or an accessory was placed properly into a corresponding piece of hygiene equipment.

FIG. 7A shows a schematic view of a general apparatus embodiment of the present invention. Specifically, there is shown the apparatus 10, 101 which provides a view of displayed images to a human operator via a head-mounted display (HMD) 1 wherein the HMD 1 is further configured to further provide a view of a piece of hygiene equipment. The view of the piece of hygiene equipment can either be obtained by also generating and displaying respective images and/or letting the observer view a real-world piece of hygiene equipment by means of a transparent section of the HMD 1 and/or a camera associated to the HMD 1 and superimposing and blending the camera recorded images onto the generated images. Generally, the apparatus 10, 101 can be either integrated in the HMD 1 or can be implemented external thereto. Also, hybrid solutions can be envisaged in which one part of the described functionalities is implemented into the HMD 1, and the other functionalities are implemented outside the HMD 1. For an example, may functions can be integrated into a mobile computing device (e.g., smartphone, tablet computer and the like) and the HMD 1 can be implemented as a frame positioning the mobile computing device in front of the observer's eyes. In this case also optics may be provided in order to let the observer view the device's display at small distances.

The apparatus 10, 101 comprises an interface 112 to a sensor which is configured to generate a motion sensor output indicating a movement of a human operator while using said HMD 1. Here one or more sensors may be integrated in the HMD 1, in a mobile computing device being part thereof, and/or also—external to the HMB—affixed to the operator. The apparatus 10, 101 further comprises an access 111 to a data repository 121 which stores base data for generating images representing views of an environment in which tasks by said human operator can be performed. The data repository can be again integrated in the device or obtained as some network or cloud based data storage in which a wireless and/or wire-bound connection serves to convey the data to and from the interface 111.

The apparatus 10, 101 further comprises or has access to an image generation section 113 that is configured to generate the images to be displayed based on said base data and said motion sensor output. A sequencer section 114 is configured to determine a sequence of situations in relation to view, and an event section 115 is configured to determine a use situation of said piece of hygiene equipment.

In an optional embodiment (cf. dashed line in FIG. 7A), the event section 115 is configured to receive a feedback signal FB from the HMD 1 indicating use of a piece of hygiene equipment. For example, a real-world piece of hygiene equipment can be provided with an emitter that emits a signal (optical, infrared, radio, and the like) whenever it is used (e.g., ejects an amount of a disinfectant liquid). In turn, the HMD 1 may be provided with a sensor that is adapted to receive this signal and the HMD 1 may be configured to initiate the feedback signal FB toward the apparatus 10, 101 accordingly. In the case that all or some functionalities of the apparatus 10, 101 are integrated into the HMD 1, then the feedback signal FB may be well routed internally. This may be associated with the specific advantage that the HMD 1 will be in a more or less close proximity to the piece of hygiene equipment when the operator uses it. This allows for a low energy and low interference and low complexity implementation of the signal from the piece of hygiene toward the HMD. For example, it may be sufficient to emit an optical light signal (flash) that can be captured by a mobile device's camera, which, in the case of a smartphone or tablet, is usually arranged opposite the display already.

FIG. 7B shows a schematic view of a general apparatus embodiment of the present invention. In principle, the apparatus 11 provides the same base features as the apparatus 10, 101 described above especially in conjunction with FIG. 7A. Thus same reference numerals denote same, similar, or accordingly adapted features. In this embodiment, the apparatus 11 may be provided with a section 116 for receiving camera input which can be processed for detecting movements and/or gestures from the operator. Further, In this embodiment, the apparatus 11 may be provided with a section 117 for generating an image output to a peer monitor. On this monitor the same or related images may be displayed that are viewed by the operator. In this way, the training procedure can be shared by several individuals who can in this way benefit from the training performed by someone else.

FIG. 8 shows a schematic flow chart of a general method embodiment of the present invention. This general method embodiment is for providing to a human operator a view of displayed images and a view of a piece of hygiene equipment. The method comprises a step S1 of generating a motion sensor output indicating a movement of a human operator and a step S2 of accessing a data repository which stores base data for generating images representing views of an environment in which tasks by said human operator can be performed. The method further comprises a step S3 of generating the images to be displayed based on said base data and said motion sensor output, a step S4 of determining a sequence of situations in relation to a view by said human operator, and a step S5 of determining an event in relation to said piece of hygiene equipment and allocating said determined event in relation to the sequence of situations. The described steps need not to be performed in the given order. In general, one or more step(s) may be performed concurrently, as specifically shown for steps S1 and S2.

According to further embodiment, the apparatus comprises a compliance estimation section that calculates some figure indicating an achieved compliance that can be presented to the Operator. For example, such a figure can be defined so that a relatively low compliance value may indicate that the actual use of hygiene equipment is not satisfactory, whilst a relatively high compliance value may indicate that the actual use of hygiene equipment corresponds, within a given threshold, to some target usage, and, consequently, may be regarded as being satisfactory. Such a figure, e.g., in form of a compliance metric, may provide many advantages, since it gives a concise picture on how good the actual behavior corresponds to the target.

Such a compliance metric may consider both opportunities and uses. Said opportunities indicate any event when hygiene equipment should or could have been used. For example, opportunities can be defined with reference to the above-described "Five Moments Of Hand Hygiene". This allows one to associate opportunities to situations within a possible sequence of scenarios as steered by an operator when and during trying to fulfil a task. Following this example, an opportunity can be associated with a situation that corresponds to approaching a virtual patient or a situation that would correspond to an actual physical contact with a real-life patient. A rule could then require that hand hygiene equipment should be used before such an opportunity, or the corresponding situation in the sequence.

Here, the compliance estimation section can evaluate the situations obtained from the sequencer section and associate some situations to opportunities. At the same time, the compliance estimation section can receive from the event section determined use situations. With the help of rules that define in some way or another a so to speak target sequence of situations, the compliance estimation section can determine whether there was appropriate use of a piece of hygiene equipment corresponding to the applicable opportunities. In all, the compliance estimation section can collect pairs of several opportunities and uses and, for example, at an end of a task, employ the user interface so as to present a result to the operator.

In general, the feedback regarding the performance during operation (i.e., performing a task with the apparatus) or towards the end will emphasize the training effect. This feedback can be associated with a high score list, playback options, graphics, music fanfares and the like to "reward" the operator, or not reward the operator if the score was bad, i.e., an obtained compliance metric is below a certain threshold. The sequence of target events that defines the task may be weighed according to the performance of the operator (both within the same performing of a task and/or compared to previously performed tasks).

In summary, embodiments of the present invention allow for operators to train behavior relevant to hand hygiene compliance. The training is rendered in such a way that the operators have an improved perception of all task as close to the real world as possible (cf. above description in conjunction with FIG. 1). In other words, the embodiments allow the operator to train the relevant aspects to hand hygiene compliance by means of simulating tasks that mimic real world tasks and combine the training with the possible use of real world hygiene equipment.

The latter allows for also giving the operator a real life experience of the use of hygiene equipment which again improves efficiency of perception. In the end, the operator may be presented with an achieved compliance so as to motivate him/her further and/or provide indications toward improvement. The result is improved training of operators which will lead to improved use of hygiene equipment in the actual world, which, in turn, can help reducing the risk of hygiene relevant diseases or other disadvantages.

Although detailed embodiments have been described, these only serve to provide a better understanding of the invention defined by the independent claims and are not to be seen as limiting.

What is claimed is:

1. An apparatus to provide to a human operator a view of displayed images and a view of a piece of hygiene equipment, the apparatus comprising:
   an interface to a sensor which is configured to generate a motion sensor output indicating a movement of a human operator;
   access to a data repository which stores base data for generating images depicting at least one operation of a particular piece of hygiene equipment in which different tasks by said human operator can be performed, each given task including performing the at least one operation of the particular piece of hygiene equipment that is a given point in a process necessary to complete the given task;
   an image generation section configured to generate the images depicting the at least one operation of the particular piece of hygiene equipment being artificial based on said base data and said motion sensor output;
   a sequencer section configured to determine the at least one operation associated with the given task currently performed by said human operator in relation to a viewing of the one or more pieces of hygiene equipment viewed by said human operator; and
   an event section configured to determine an event corresponding to said viewed piece of hygiene equipment and to allocate said determined event in relation to the at least one operation of the particular piece of hygiene equipment determined by the sequencer section; and
   a sensor configured to detect at least one signal from said particular piece of hygiene equipment,
   wherein said event is performed by said human operator in response to performing said at least one operation of said particular piece of hygiene equipment to achieve said given task, and
   wherein said sensor receives said at least one signal directly from said particular piece of hygiene equipment being viewed by said human operator via the apparatus in response to said human operator performing said event on said particular piece of hygiene equipment viewed by said human operator via the apparatus, the signal indicating a completion of the at least one operation of the particular piece of hygiene equipment that is the given point in the process necessary to complete the given task.

2. The apparatus according to claim 1, wherein the event section is configured to determine whether said allocation is to result in providing a feedback to said human operator.

3. The apparatus according to claim 2, wherein said image generation section is configured to generate one or more further images to be displayed based on said determination that the allocation is to result in providing a feedback.

4. The apparatus according to claim 1, wherein the sequencer section is configured to determine a sequence of situations in relation to a displayed image.

5. The apparatus according to claim 1, further comprising an input receiving section configured to receive an input from the human operator and to determine any one of the event and the given task based on the input.

6. The apparatus according to claim 5, wherein any one of the event and the given task includes any one of an installation of the particular piece of hygiene equipment, a maintenance of the particular piece of hygiene equipment, a servicing of the particular piece of hygiene equipment, and a refilling of the particular piece of hygiene equipment.

7. The apparatus according to claim 1, wherein the event section comprises a sensor configured to detect a signal in relation to a use of a piece of hygiene equipment.

8. The apparatus according to claim 1, wherein the event section is configured to determine an event a completed task in relation to said piece of hygiene equipment.

9. The apparatus according to claim 1, wherein the event section is configured to determine said event in response to detecting said signal from the piece of hygiene equipment.

10. The apparatus according to claim 1, further comprising a sound output section configured to output a sound to said human operator in relation to allocating a determined event.

11. The apparatus according to claim 1, wherein the images are displayed images via a head-mounted display, HMD, and said sensor is configured to generate a motion sensor output while the human operator uses said HMD.

12. The apparatus according to claim 1, wherein the data repository stores further base data for generating images representing views of a piece of hygiene equipment, and wherein the image generation section is configured to generate the images to be displayed also based on said further base data.

13. The apparatus according to claim 1, being implemented as a mobile computing device selected from any one of a mobile phone, a smart phone, a tablet computer, a personal digital assistant, and a portable computer.

14. The apparatus according to claim 1, being implemented as a mobile computing device and said detector being implemented by a camera of said mobile computing device.

15. The apparatus according to claim 1, wherein the piece of hygiene equipment is any one of a soap dispenser, a dispenser for disinfectant solutions, gels or substances, a towel dispenser, a glove dispenser, a tissue dispenser, a hand dryer, a sink, a bin, a used hygienic product receptacle, an ultraviolet (UV) light assisted disinfectant point, and a radiation assisted disinfectant point.

16. The apparatus according to claim 1, wherein the images depicting at least one operation of a particular piece of hygiene equipment in which different tasks by said human operator can be performed includes at least one of operation of the particular piece of hygiene equipment, installation of the particular piece of hygiene equipment, maintenance of the particular piece of hygiene equipment, servicing of the particular piece of hygiene equipment, and refilling of the particular piece of hygiene equipment.

17. A method to provide to a human operator a view of displayed images and a view of a piece of hygiene equipment, the method comprising the steps of:
generating a motion sensor output indicating a movement of a human operator;
accessing data repository which stores base data for generating images depicting at least one operation of a particular piece of hygiene equipment in which different tasks by said human operator can be performed, each given task including performing the at least one operation of the particular piece of hygiene equipment that is a given point in a process necessary to complete the given task;
generating the images depicting the at least one operation of the particular piece of hygiene equipment;
determining the at least one operation associated with the given task currently performed by said human operator in relation to a viewing of the one or more pieces of hygiene equipment viewed by said human operator; and
determining an event corresponding to said viewed piece of hygiene equipment and to allocate said determined event in relation to the at least one operation of the particular piece of hygiene equipment; and
detecting, via a sensor remotely located from said particular piece of hygiene equipment, at least one signal directly received from said particular piece of hygiene equipment being viewed by said human operator via the apparatus in response to said human operator performing said event on said particular piece of hygiene equipment,
wherein said sensor receives said at least one signal directly from said particular piece of hygiene equipment being viewed by said human operator via the apparatus in response to said human operator performing said event on said particular piece of hygiene equipment viewed by said human operator via the apparatus, and
wherein said event is performed by said human operator in response to performing said at least one operation of said particular piece of hygiene equipment to achieve said given task, and said signal indicates a completion of said at least one operation of the particular piece of hygiene equipment that is the given point in the process necessary to complete the given task.

18. The method of claim 17, wherein any one of the event and the given task includes any one of an installation of the particular piece of hygiene equipment, a maintenance of the particular piece of hygiene equipment, a servicing of the particular piece of hygiene equipment, and a refilling of the particular piece of hygiene equipment, and
wherein the images depicting at least one operation of a particular piece of hygiene equipment in which different tasks by said human operator can be performed includes at least one of operation of the particular piece of hygiene equipment, installation of the particular piece of hygiene equipment, maintenance of the particular piece of hygiene equipment, servicing of the particular piece of hygiene equipment, and refilling of the particular piece of hygiene equipment.

* * * * *